United States Patent Office 3,425,848
Patented Feb. 4, 1969

3,425,848
OSMOTIC DEHYDRATION OF COATED FOODS
Wayne M. Camirand, Albany, and Ralph R. Forrey, San Francisco, Calif., assignors to the United States of America as represented by the Secretary of Agriculture
No Drawing. Filed June 8, 1966, Ser. No. 555,958
U.S. Cl. 99—199     9 Claims
Int. Cl. A23b 7/08

A non-exclusive, irrevocable, royalty-free license in the invention herein described, throughout the world for all purposes of the United States Government, with the power to grant sub-licenses for such purposes, is hereby granted to the Government of the United States of America.

This invention relates to and has among its objectives the provision of novel methods for dehydrating solid foods, for example, fruits, vegetables, and meats. Further objects of the invention will be evident from the following description wherein parts and percentages are by weight unless otherwise specified.

In the copending application of James D. Ponting and Ralph R. Forrey, Ser. No. 545,965, filed Apr. 28, 1966, there is disclosed a dehydration process which utilizes the principle of osmosis. Typically, the food to be treated—sliced apple, for example—is mixed with sugar or sugar syrup and the mixture allowed to stand. Thereby moisture diffuses from the food pieces into the surrounding sugary medium with the result that dehydration of the food is achieved.

In accordance with the present invention, it has been found that superior results are obtained when the food is coated with a water-permeable membrane prior to subjecting it to the osmotic treatment. Thus, in a practice of the present invention the food to be dehydrated is first provided with a membrane coating. The coated food is then contacted with an osmotic medium—for example, sugar or sugar syrup—in order to achieve dehydration by osmosis, i.e., diffusion of moisture from the food into the surrounding osmotic medium.

A primary advantage of the process of the invention is that it yields a greater degree of osmotic dehydration than is obtained without the membrane coating but under otherwise identical conditions. In fact, the membrane coating enhances the dehydration to such an extent that some foods can be dehydrated to a self-preserving level by the use of osmotic dehydration alone, that is, supplemental treatment by air-drying or vacuum-drying is rendered unnecessary.

Another advantage is that the membrane minimizes loss of desired constituents—e.g., flavor and nutrient materials—through diffusion into the osmotic medium. Moreover, the membrane coating minimizes diffusion of the solute (used in the osmotic medium) into the food. Thus, although the membrane coating enhances diffusion of water from the food to the surrounding osmotic medium, it impedes diffusion of nutrients and flavor components from the food to the medium, and also impedes diffusion of solute from the medium into the food.

Another advantageous item is that the membrane coating exerts a protective effect. For example, the coating protects the final product from air, dirt, bacterial contamination, etc., while in storage.

Another advantage is that when the final product is contacted with water to rehydrate it for consumption, the loss of flavor and nutrient components through diffusion into the rehydrating medium is minimized. In other words, when the product is contacted with water the main action which takes place is diffusion of water into the dehydrated product and there is little, if any, diffusion of the flavor or nutrient components of the food into the surrounding aqueous medium.

A further advantage is that the dehydration in accordance with the invention is effectively carried out without application of heat, whereby one avoids alteration of flavor. Moreover, there is no damage to nutrient components and there is no loss of volatile flavor components by vaporization.

As noted above, in a practice of the invention the food to be dehydrated is first provided with a water-permeable membrane coating. Various substances may be used to provide this coating. It is obvious that the substance must be edible and be film-forming, i.e., it must be of high molecular weight so that it will form a continuous film. Typical substances which may be used are listed below by way of illustration, but not limitation:

Pectin or pectin derivatives, e.e., ordinary (high-methoxyl) pectin; low-methoxyl pectins; pectic acid or pectates such as sodium pectate or other water-soluble salt of pectic acid.

Cellulose derivatives such as methyl cellulose, ethyl cellulose, hydroxyethyl cellulose, carboxymethyl cellulose, and the like.

Starch and starch derivatives, e.g., carboxymethyl starch, carboxymethyl amylopectin, and the like.

Polysaccharide gums such as tragacanth, arabic, karaya, etc.

Proteins such as gelatin, casein, zein, gluten, soybean protein, and the like.

The food may be coated with the selected substance in any of the usual ways well known in the art. For example, the coating substance is dissolved in water, the food is dipped in the solution, and then removed and drained. In the event that the substance has a low solubility in water, a volatile organic solvent may be used for preparing the coating solution. Where such a system is used, it is preferred to expose the coated food to air-drying to evaporate the solvent. For example, zein is preferably applied from alcohol solutions. Thus the food is dipped in a solution of zein in alcohol, drained and then dried in air to evaporate residual alcohol from the coating.

Particularly good coatings for the purposes of the invention are provided by the low-methoxyl pectins. Thus in a preferred embodiment of the invention, the coating is formed as follows: an aqueous solution of a water-soluble low-methoxvyl pectin is prepared. The concentration of the solution is not critical; usually it contains about 1 to 5% of the low-methoxyl pectin. The food is dipped in this solution, then removed and drained. It is further preferred to harden the pectinate coating by dipping the coated food in a solution of a non-toxic, soluble, ionizable calcium salt such as calcium chloride, acetate, or nitrate. When this is done a metathesis occurs: The alkali ions (usually sodium, potassium, or ammonium) of the pectinate are at least partly replaced by calcium with the result that the liquid coating is changed to a gel coating which is smooth and slippery; hence, the coated food pieces show no tendency to cohere to one another. After dipping in the calcium hardening bath, the coated food pieces are drained, or, they may be additionally rinsed in water to remove any residual hardening solution. A similar technique may be used for providing the food pieces with calcium pectate coatings. It may be noted that we claim no novelty in this procedure of coating per se; it is fully disclosed by Lowe and Swenson, U.S. Patent 2,576,952, Dec. 4, 1951, and Owens and Schultz, U.S. Patent 2,611,708, Sept. 23, 1952. Indeed, the materials and procedures described in these patents are particularly adapted for forming the coatings for the purposes of the present invention. Another useful method of forming pectinate coatings is the one-dip method described by Owens and Schultz in U.S. Patent No. 2,517,595, Aug. 8, 1950, wherein the food is dipped in an aqueous dispersion of a calcium-alkali pectinate, then removed from the dispersion and drained.

It is within the ambit of the invention to provide supplemental ingredients in the coating solutions whereby to give the coating a desired characteristic. Typically, one may add to the coating solutions such ingredients as: food dyes, plasticizers, mold-inhibiting agents. flavorings, or anti-oxidants, all as described in the aforesaid Patents 2,517,595, 2,576,952, and 2,611,708.

After the food pieces have been provided with the coating, they are contacted with a suitable medium to attain the desired osmotic effect, that is, diffusion of moisture from the food into the surrounding osmotic medium.

As the osmotic medium, one can use any non-toxic water-soluble substance, or mixtures of such substances. Sugars are preferred substances and, typically, one may use sucrose, dextrose, lactose, maltose, invert sugar, or other individual sugar or mixture of sugars. Examples of other substances which may be employed are: Sodium chloride, citric acid, tartaric acid, malic acid, sodium citrate, sodium tartrate, sodium malate, sorbitol, mannitol, monosodium glutamate, sodium gluconate, sodium potassium tartrate, mixtures of these substances with one another or with sugars, etc. The osmotic medium may consist of the selected substance in the solid form, preferably in a finely-divided state so that it can be maintained in intimate contact with the coated food to be dehydrated. However, in a preferred embodiment of the invention, the osmotic medium is an aqueous solution of the substance. This provides several advantages. For example, the solution can be easily conveyed with pipes and conventional pumps to the treating vessel. After use, the spent solution can be readily concentrated to put it into condition for treating another batch of food. Also with the solution, separation of the food after the osmosis step is easier and more efficient than where a solid substance is employed. In order to drive the osmosis in the desired direction, it is obvious that the solution should be hypertonic with respect to the food, that is, the concentration of solute in the solution should be higher than the concentration of water-soluble solids in the food. Generally, it is preferred to use aqueous solutions of sugars, i.e., syrups, especially those which contain at least 60% of sugar. Particularly preferred are sucrose or invert sugar syrups of at least 65 to 75% concentration. Invert sugar has the advantage that it is more soluble than sucrose so that it may be formed ino syrups of higher concentration.

Ordinarily, the osmosis step is carried out for convenience at room temperature. However, higher or lower temperatures can be used. Higher temperatures have the effect of increasing the rate of moisture diffusion from the food to the surrounding osmoic medium, i.e., accelerating the rate of dehydration. Although the osmosis step may be conducted at elevated temperatures to accelerate the rate of moisture diffusion, the upper limit is generally not higher than about 150° F., whereby to avoid alteration of the flavor of the food. This is particularly important with fruits where the aim is to preserve their natural flavor and avoid development of cooked flavors.

In order to attain a useful rate and degree of dehydration, it is necessary to contact the food pieces with an adequate amount of the osmotic medium. For example, when a dry solute is used in the osmosis, one should use at least one part thereof per part of food. With the solutions or syrups even larger proportions are preferred, i.e., at least three parts per part of food. Typical examples of proportions of syrups of different concentrations which provide good results are:

75% syrup, 3 parts per part of food,
70% syrup, 5 parts per part of food,
65% syrup, 7–10 parts per part of food.

It is further believed that by supplying an adequate proportion of osmotic medium, as above set forth, one attains not only a fast rate and a high degree of dehydration but also diffusion of solute into the food is minimized, whereby the flavor of the product is not altered.

In conducting the osmosis step it is simply necessary to contact the coated food pieces with the selected medium, in dry or solution form. The process can be conducted statically, i.e., by mixing the food and medium and allowing the composite material to stand. In the alternative, the composite may be subjected to continuous or periodic stirring or tumbling to sweep the food surfaces with fresh portions of medium, whereby to avoid formation of local areas of decreased solute concentration. A similar result can be achieved by recirculating the medium about the food pieces, through the use of a pump, or the like. Generally, the use of dynamic conditions, such as stirring, tumbling, or recirculation of medium, provide a faster rate of dehydration. During the procedure the temperature may be adjusted as above described. In any event, the osmosis is continued until the desired degree of dehydration has been attained.

Ordinarily, the osmosis is carried out under non-evaporative conditions; that is, no attempt is made to achieve evaporation concomitantly with osmosis. It is obvious that some small degree of evaporation may occur, particularly where the osmosis step is carried out in an open vessel, but this is incidental and negligible and such performance of the osmotic step is still to be considered as under non-evaporative conditions. However, it is within the broad ambit of the invention to apply evaporation concomitantly with osmotic dehydration. This may be done, for example, by forcing a current of warm air through the mixture of the coated food pieces and osmotic medium whereby to achieve dehydration of the food not only by osmosis but also by evaporation. Another technique is to apply vacuum to the system to achieve evaporation by vacuum concomitantly with dehydration by osmosis. Further techniques for applying both evaporation and osmosis which may be employed in the process of the present invention are disclosed in the copending application of James D. Ponting, Ser. No. 211,142, filed July 19, 1962, now abandoned.

After completion of the osmosis step, the food is separated from the medium. (It may be mentioned at this point that even when the medium is initially applied in a dry state, it will ordinarily form a solution as the osmosis takes place.) The separation may be readily accomplished by allowing the composite material to drain on a screen or centrifugation may be applied to attain a more complete removal of medium from the surfaces of the food pieces. If it is desired to get even more complete removal of medium, the fruit pieces may be given a quick rinse with water.

The resulting osmotically-dehydrated food may be further treated in various ways as may be desired. For example, in cases where the osmosis is continued long enough to reduce the moisture content to a low level so that the product is self-preserving, it may be packaged in the same manner as other dehydrated foods and stored at ambient temperatures until required for use. In the event that the osmosis is continued only long enough to get a partial dehydration—for example, to reduce the weight of the food by 40 to 60% through loss of moisture—the product may be frozen and stored in the frozen state until it is to be consumed. In the alternative, the partially dehydrated foods may be further dehydrated by conventional techniques, for example: by drying in a current of warm air; by vacuum drying with or withoutt application of heat; by freeze-drying; etc.

It may be noted that the coating applied prior to the osmosis step remains on the food during the osmosis treatment and any subsequent treatments such as freezing, further dehydration, etc. The net result is that the final product retains the coating. This is no detriment because the coating can be consumed with the food and does not detract from the flavor or appearance of the food. Indeed, as noted above, the coating exerts a desirable protective action. Where the products are cooked before eating, as by boiling in water, then the coating is removed by a solution or disintegration effect. Thus in any case, whether the products are consumed directly or cooked first, there is no need to remove the coating.

The process of the invention is of wide applicability and can be used for dehydrating solid foods of all kinds, for example, fruits, vegetables, meats, herbs, etc. Generally, as a preliminary step the food material is cut into strips, slices, cubes, chips, or other pieces as conventional in dehydration practice. The smaller items such as shrimp, prawns, small oysters or clams, etc. may be processed after merely cleaning and removing the shells or other inedible portions.

The invention is further demonstrated by the following illustrative examples:

EXAMPLE 1

A lot of fresh shrimp was washed and the shells removed. The shrimp were then dipped in a 2% aqueous solution of low-methoxyl pectin for about one minute. Excess pectin solution was drained off and the shrimp dropped into an aqueous saturated solution of calcium nitrate. After holding in the solution for about one-half minute, the shrimp were removed, rinsed with water, and drained. It was noted that the shrimp were coated with a thin, almost invisible, transparent, colorless, gell-coating of the calcium pectinate.

The coated shrimp were placed in a container and a sugar syrup poured over them, using enough of the syrup to completely cover the shrimp. The syrup had a solids content of 70%, of which half was invert sugar and half sucrose. To keep the shrimp submerged in the syrup they were covered with a weighted perforated plate. The system was allowed to stand at room temperature for 72 hours. The shrimp were then removed from the syrup and drained. The dehydrated shrimp showed a weight loss of 55%.

For comparison purposes, a quantity of uncoated peeled shrimp was subjected to the same treatment with the syrup as above described. In this case the weight loss was 41%.

Both of the products—the coated and uncoated dehydrated shrimp—were rehydrated by soaking in water at room temperature for 24 hours. The rehydrated shrimp were then French fried. The coated shrimp had excellent flavor. The uncoated shrimp was excessively sweet, indicating impregnation of the tissue with sugar during the osmotic dehydration.

EXAMPLE 2

(A) Ground beef (chuck) was rolled into balls about 1 inch in diameter. Half of the balls were coated by immersing for about one minute in a 2% aqueous solution of low-methoxyl pectin, draining to remove excess pectin solution, immersing for about one-half minute in aqueous (almost saturated) calcium nitrate, followed by rinsing in water, and draining.

(B) Using separate vessels, the coated and uncoated meatballs were then covered with sugar syrup (70% solids—half sucrose and half invert sugar). The systems were allowed to stand at room temperature for a period of time (as given below), using a perforated plate to hold the meatballs under the surface of the syrup. The dehydrated meatballs were then removed from the syrup, drained, and weighed to calculate the weight loss.

(C) The procedure as described above was applied to various other foods:

Swordfish—cut into 1.5 inch cubes,
Beef rump—cut into slices approximately 2.5 in. long, 1 inch wide, ⅜ inch thick,
Salmon—cut into strips about 4 in. long, 1.5 in. wide, ¼ inch thick.

The results are tabulated below:

| Food | Time of osmotic dehydration, hrs. | Weight loss, percent |
|---|---|---|
| Meatballs (coated) | 72 | 42 |
| Meatballs (uncoated) | 72 | 13 |
| Swordfish (coated) | 93 | 36 |
| Swordfish (uncoated) | 93 | 32 |
| Beef (coated) | 120 | 54 |
| Beef (uncoated) | 120 | 21 |
| Salmon (coated) | 143 | 38 |
| Salmon (uncoated) | 143 | 2 |

EXAMPLE 3

Bananas: peeled and cut transversely into ¼ inch thick slices.

Pineapple: peeled, cut transversely into ½ inch thick slices, slices cut into quarters.

Apples (McIntosh): peeled, cored, and cut into twelfths.

The above foods were coated and subjected to osmotic dehydration as described in Example 2. The results are tabulated below:

| Food | Time of osmotic dehydration, hrs. | Weight loss, percent |
|---|---|---|
| Banana | 75 | 49 |
| Pineapple | 51 | 23 |
| Apple | 90 | 73 |

Having thus defined our invention, we claim:

1. In the process of osmotic dehydration wherein pieces of food are held in contact with an osmotic medium to cause diffusion of moisture from the food into the medium, the improvement which comprises providing the food pieces with an edible, water-permeable, membrane coating prior to contact with the osmotic medium.

2. The process of claim 1 wherein the said coating contains a pectin.

3. The process of claim 1 wherein the said coating contains a low-methoxyl pectin.

4. The process of claim 1 wherein the said coating contains a calcium low-methoxyl pectinate as a film-forming agent.

5. The process of claim 1 wherein the osmotic medium is sugar.

6. The process of claim 1 wherein the osmotic medium is sugar syrup.

7. In the process of osmotic dehydration wherein pieces of food are held in contact with an osmotic medium to cause diffusion of moisture from the food into the medium, the improvement which comprises:
  (A) Applying an aqueous solution of a low-methoxyl pectin to the food pieces,
  (B) Contacting the so-treated food pieces with an aqueous solution of a calcium salt to provide them with a gel coating and then
  (C) Contacting the gel-coated food pieces with the said osmotic medium.

8. The process of claim 7 wherein the osmotic medium is sugar.

9. The process of claim 7 wherein the osmotic medium is sugar syrup.

References Cited

UNITED STATES PATENTS

| | | | |
|---|---|---|---|
| 2,420,517 | 5/1947 | Brandner et al. | 34—9 |
| 2,482,202 | 9/1949 | Noyes | 99—193 |
| 2,517,595 | 8/1950 | Owens et al. | 99—166 |
| 2,611,708 | 9/1952 | Owens et al. | 99—166 |

RAYMOND N. JONES, *Primary Examiner.*

S. B. DAVIS, *Assistant Examiner.*

U.S. Cl. X.R.

99—204, 208, 209